United States Patent [19]

Carnes

[11] Patent Number: 5,114,203
[45] Date of Patent: May 19, 1992

[54] RETAINER DEVICE AND KEYHOLE ATTACHING ARRANGEMENT

[75] Inventor: Vince S. Carnes, Belleville, Mich.

[73] Assignee: Chrysler Corporation, Highland Park, Mich.

[21] Appl. No.: 632,828

[22] Filed: Dec. 24, 1990

[51] Int. Cl.⁵ .............. B62D 25/00; B62D 33/00; F16B 37/00; F16B 39/00
[52] U.S. Cl. .................. 296/50; 296/191; 296/57.1; 411/104; 411/107; 411/970; 411/999
[58] Field of Search .......... 411/84, 85, 104, 107, 411/174, 175, 182, 970, 999; 296/50, 57.1, 191

[56] References Cited

U.S. PATENT DOCUMENTS

| | | | |
|---|---|---|---|
| 2,704,680 | 3/1955 | Bedford, Jr. | 411/970 |
| 2,781,073 | 2/1957 | Trafton | 411/174 |
| 2,853,113 | 9/1958 | Flora et al. | 411/970 |
| 3,049,369 | 8/1962 | Trafton | 411/970 |
| 4,422,276 | 12/1983 | Paravano | 411/104 |
| 4,623,182 | 11/1986 | Trabert et al. | 411/107 |

Primary Examiner—Neill R. Wilson
Attorney, Agent, or Firm—Edward P. Barthel

[57] ABSTRACT

A one-piece plastic retainer device is provided for snap-in blind attachment in a keyhole-shaped apertured panel. The retainer device comprises a flat rectangular base having a push-in fastener shank adjacent one transverse edge. The shank extends from the base inner face while a fastener head and subjacent spacer collar extend from the base outer face in coaxial alignment with the shank. An integral wedge-shaped locking cam projects from the base outer face and is aligned on the base major axis of symmetry adjacent the base other transverse edge. The locking cam has a raised outboard facet and an inboard ramp sloped toward the fastener head with the facet spaced a predetermined longitudinal distance from a transverse outboard collar stop shoulder. The panel keyhole-shaped aperture is configured and dimensioned enabling the head to be initially inserted in the circular opening thereof. Upon the retainer being moved longitudinally into the slot the retainer is captured in a snap-in manner by virtue of the collar stop shoulder and the cam facet being positioned juxtaposed associated longitudinally opposed ends of the keyhole-shaped aperture.

1 Claim, 2 Drawing Sheets

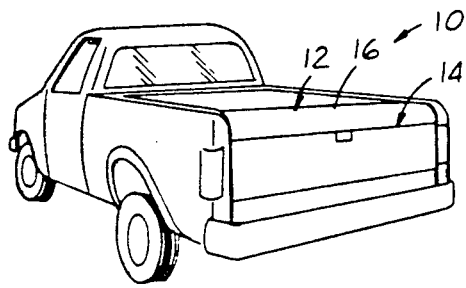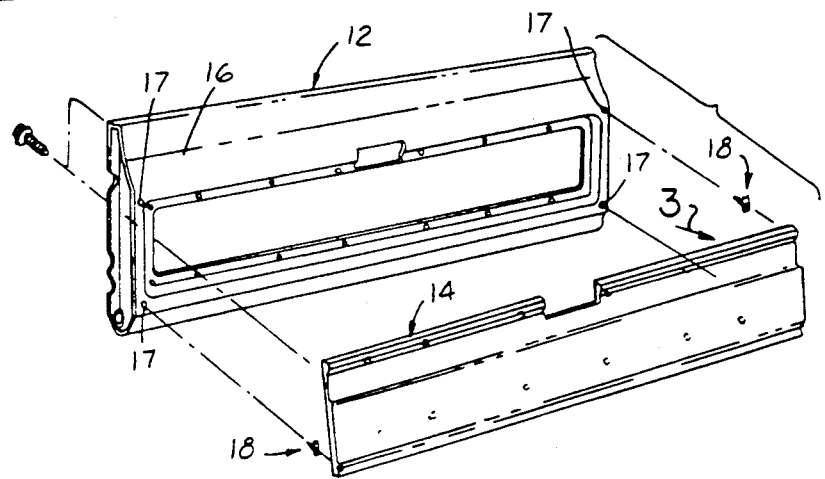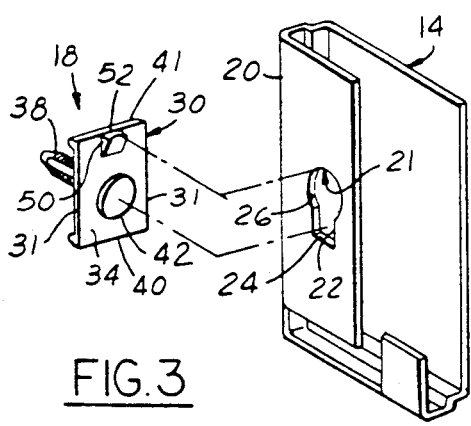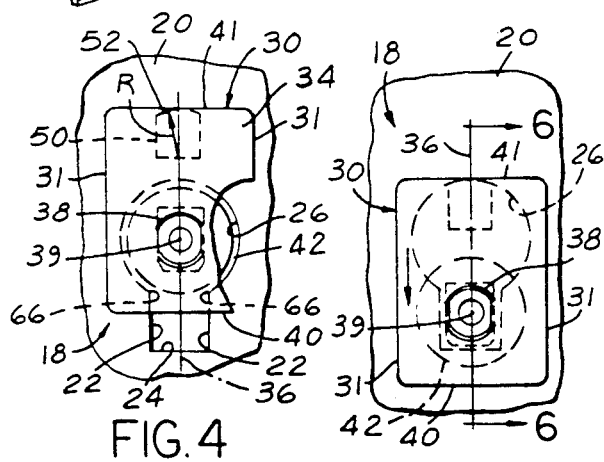

5,114,203

RETAINER DEVICE AND KEYHOLE ATTACHING ARRANGEMENT

BACKGROUND OF THE INVENTION

This invention relates to a retainer device and keyhole attaching arrangement therefore and more particularly to a one-piece plastic retainer device having an integral pine-tree fastener with the device adapted for snap-in blind connection to a panel keyhole-shaped aperture.

The prior art is replete with fastener arrangements for securing an apertured panel to an apertured support. The U.S. Pat. No. 3,119,476 entitled Fastener Devices, dated Jan. 28, 1964, and U.S. Pat. No. 3,271,059 entitled Clip For Fastening Together Two Apertured Panels, dated Sep. 6, 1966, both issued to A. S. Pearson are examples of two such arrangements.

SUMMARY OF THE INVENTION

It is an object of the present invention to provide an assembly between a one-piece plastic retainer device and a keyhole apertured panel in a blind snap-in manner.

It is another feature of the present invention to provide an improved assembly of a one-piece plastic retainer device and a keyhole apertured as set forth above having a drive fastener shank adapted to be readily secured to a sheet-like support by being axially inserted in a support mounting hole.

In accordance with a preferred embodiment of the invention, a decorative trim or applique panel is adapted to be supported on the outer face of a vehicle body underlying metal skin. The trim panel has its vertical ends formed with a return flange adapted to support a plurality of fasteners of the push-in pine-tree type such as shown in the U.S. Pat. No. 4,422,276 issued Dec. 27, 1983 to Paravano or the U.S. Pat. No. 4,865,281 issued Sep. 12, 1989 to Woolar. Applicant's invention provides a one-piece plastic retainer device allowing ready blind snap-in attachment in a keyhole-shaped aperture in the panel return flange. The retainer device comprises a flat rectangular base having a push-in shank adjacent one transverse edge thereof so as to extend from the base bottom side. A collar extends from the base upper side and integrally supports in a spaced manner a fastener enlarged head in coaxial alignment with the shank.

An integral locking cam projects from the base upper side and is aligned on the base major longitudinal axis of symmetry adjacent the base other transverse edge. The locking cam is formed with a raised arcuate outboard facet and an inboard ramp sloped toward the fastener head. The facet is spaced a predetermined longitudinal distance from a transverse collar stop shoulder positioned in opposed relation to the ramp. The panel return flange is formed with a keyhole-shaped aperture comprising a slot portion having a closed transverse edge terminating at its open end in a circular opening. The keyhole-shaped aperture is configured and sized enabling the retainer head to be initially inserted in the keyhole circular opening. Upon the retainer collar being moved longitudinally into the keyhole slot, the retainer is captured in a blind snap-in manner. This results by virtue of the collar stop shoulder and the cam facet being positioned juxtaposed associated longitudinally opposed ends of the keyhole-shaped aperture. Accordingly, the pine-tree stem projects normally from the return flange and is adapted for push-in insertion in an associated matching hole in the vehicle body skin.

BRIEF DESCRIPTION OF THE DRAWINGS

These and other objects and features of the invention will appear from the following description and the accompanying drawings in which:

FIG. 1 is a perspective view of a pick-up truck having a tailgate adapted for use with the present invention;

FIG. 2 is an enlarged exploded perspective view of the tailgate of FIG. 1 showing the body wall and attaching panel adapted to be mounted thereto by the fastening arrangement of the present invention;

FIG. 3 is an enlarged fragmentary exploded perspective view of the panel retainer device and a panel return flange having a keyhole-shaped aperture formed therein;

FIG. 4 is a fragmentary elevational view, partly broken away, of a retainer device partially in place on a return flange of a panel to be mounted on a sheet support;

FIG. 5 is a view similar to FIG. 4 showing the retainer device fully in place on a return flange;

FIG. 6 is a fragmentary vertical sectional view, partly in elevation, taken on the line 6—6 of FIG. 5;

FIG. 7 is a fragmentary elevational view taken in the direction of arrow "7" in FIG. 6;

FIG. 8 is a fragmentary elevational detail view of the keyhole-shaped aperture in the panel return flange;

DETAILED DESCRIPTION OF THE INVENTION

Figure 9:
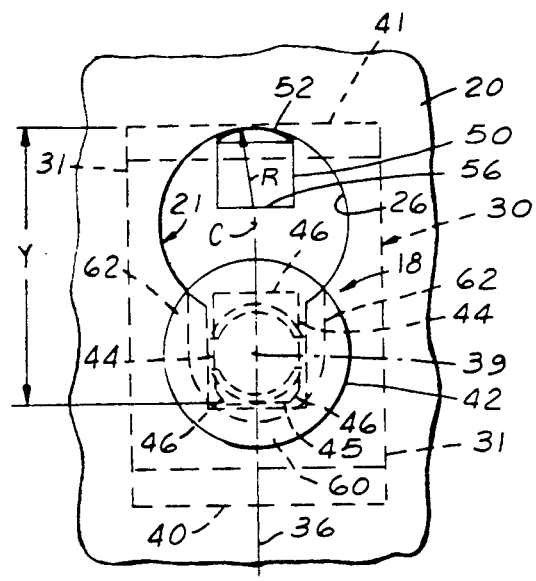
FIG. 9 is an enlarged fragmentary elevational view of the attaching arrangement shown in FIG. 7.

Referring first to FIG. 1 there is shown a perspective view of a pick-up truck 10 having a tailgate 12 adapted for supporting an applique panel 14 on outer sheet metal skin 16 of the tailgate by means of four holes 17. FIG. 2 shows the applique panel 14 provided with a plurality of retainer devices, generally indicated at 18, adapted for attachment to a vertically extending return flange 20 (FIG. 3) of panel 14.

With reference to FIG. 8 the right hand return flange 20 is formed with a keyhole-shaped aperture, generally indicated at 21, including a longitudinally extending slot portion having parallel side edges 22 and a closed transverse edge 24. The slot portion terminates at its one open end in a circular shaped opening 26 having a center of curvature "C" and a predetermined diameter "D". The keyhole-shaped aperture has an overall longitudinal major dimension "L" measured between the slot closed end 24 and longitudinally opposed arcuate locking edge portion 27 of opening 26. Thus, the keyhole shaped aperture 21 is configured and sized to receive the one-piece plastic retainer device 18 in a snap-in manner as will be explained below.

As seen in FIGS. 3 and 6, the retainer device 18 comprises a flat rectangular base 30 defined by parallel side edges 31, an inner face 32, and an outer face 34, including a longitudinal axis of symmetry 36 (FIG. 4). An integral fastener pine-tree type shank 38 projects normally from the inner face 32 with its principal axis 39 (FIG. 6) intersecting the base longitudinal axis 36 at right angles. It will be noted that the shank principal axis 39 is positioned longitudinally off-center as to be adjacent base one transverse edge 40 relative to base opposite transverse edge 41. The shank 38 is adapted for axial insertion in an associated mounting hole such as the hole 17 in the tailgate outer skin 16.

Figures 10, 11, 12:
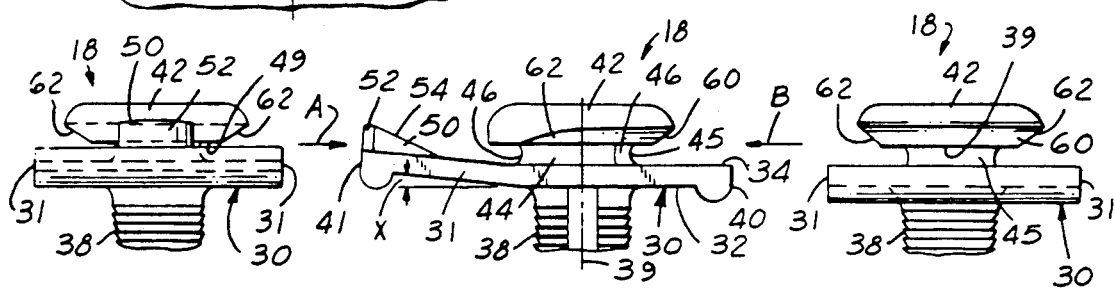
FIG. 10 an enlarged fragmentary detail end view of the retainer device taken in the direction of arrow "A" in FIG. 11.
FIG. 11 is an enlarged fragmentary side view of the retainer device.
FIG. 12 is a view similar FIG. 10 taken in the direction of arrow "B" in FIG. 11.

FIGS. 9 and 10 show the retainer device 18 formed with fastener raised circular head 42 having its center aligned on the shank principal axis 39. The head 42 is joined to the base by a subjacent generally rectangular shaped raised collar (FIG. 9) projecting from the base outer face 34 and symmetrically disposed about the base major axis 36. The collar is formed with longitudinally extending parallel guide edges 44 spaced a predetermined transverse distance apart and terminating in a opposite parallel shoulders 45 and 46 with the leading outboard stop shoulder 45 having lead-in chamfered corners 47.

The fastener circular head 42, supported on the collar, provides a predetermined layered space between head undersurface 49 and the base outer face 34. The layered space is substantially equal to the thickness dimension of the return flange 20 establishing an interference fit upon the retainer device 18 being attached to the keyhole-shaped aperture 21. The fastener head 42 has a predetermined diameter the dimension of which is slightly less than the diameter "D" of the keyhole circular opening 26 enabling the head 42 to pass therethrough.

As best seen in FIGS. 9, 10 and 11 the base outer surface 34 is formed with an integral wedge-shaped locking cam 50 symmetrically disposed about the base longitudinal axis 36. The locking cam 50 has a raised arcuate facet 52 extending normal to the base outer surface 34 and a ramp portion 54 sloped in a longitudinal direction downwardly toward the fastener head 42. It will be noted in FIG. 9 that the arcuate facet 52 has a predetermined radius of curvature "R" with its center of curvature 56 located on the base longitudinal axis 36.

With reference to FIGS. 9, 10, and 11 it will be noted that the fastener head undersurface 49 is formed with a C-shaped continuous chamfer having a half-circle segment 60 terminating in a pair of parallel trailing segments 62. The chamfer half-circle segment 60 is adapted to engage the keyhole-shaped aperture cusps 66 allowing guided smooth insertion of the retainer device 18.

To secure the panel 14 to the tailgate sheet-like support skin 16 the retainer device 18 is initially assembled with the panel return flange 20 by gripping the shank 38 and inserting the head 48 through the keyhole-shaped aperture circular opening 26, as seen in FIG. 4, with the base one transverse leading edge 40 positioned substantially parallel to the slot transversely extending closed end 24. Upon the retainer device leading edge 40 being moved longitudinally toward the slot closed end 24 the head chamfer segment 60 contacts the aperture cusps 66 which, together with the stop shoulder beveled corners 46, provide smooth lead-in travel of the collar into the slot until the collar transverse stop shoulder 45 engages the slot closed end 24.

During this longitudinal movement the raised locking cam 50 rides on the return flange outer surface until just prior to the collar stop shoulder engaging the slot closed end. This causes the trailing portion of the base, aft of the collar trailing shoulder 46, to be flexed outwardly thus biasing the head chamfer 60 into positive engagement with the return flange outer surface. FIG. 9 shows the locking cam facet 52 longitudinally spaced from the leading stop shoulder 45 a dimension "Y" which is a predetermined length less than the longitudinal maximum dimension "L" of the keyhole-shaped aperture 21.

In the disclosed embodiment the maximum dimension "L" is about 1.0 mm greater than the dimension "Y" to provide tolerance clearances. Thus during attachment, immediately preceding the collar leading stop shoulder 45 engaging the slot closed end 24, the locking cam snaps into the keyhole-shaped aperture circular portion 26. As a result of the facet 52 is located juxtaposed arcuate portion 27 while the leading shoulder 45 is positioned juxtaposed the slot closed end 24 capturing the retainer devise in the keyhole-shaped aperture.

It will be noted in FIG. 11 that the trailing or aft portion of the base 30 is angled or canted outwardly from the plane of its inner surface 32 by a slight acute angle "X" of the order of five degrees. By virtue of having the base trailing portion canted outwardly the base trailing portion peripheral upper surface 34, adjacent side edges 31, is resiliently biased into contact with the return flange outer surface insuring a tight noise free connection of the retainer device in the keyhole-shaped aperture 21.

Although only one embodiment of the invention has been illustrated and described, it is apparent that modifications and variations will readily come to mind of a person skilled in the art which modifications and variations do not fall outside the scope of the invention as defined by the following appended claims.

What is claimed is:

1. In combination with a vehicle tailgate outer sheet metal skin:
  a rectangular applique panel having a vertically extending return flange at each end, each said return flange having a plurality of attaching keyhole-shaped apertures therein, each said keyhole-shaped aperture defined by a slot portion having one closed end and an opposed open end terminating in a circular opening defining a pair of cusps at the juncture between said slot portion and said circular opening, said sheet metal skin having a plurality of mounting holes therein;
  a one-piece plastic blind attachment retainer device for each said mounting hole, each said retainer device comprising a flat rectangular elongated base having a bottom side, an upper side, and leading and trailing edges disposed transversely to a major axis defining a longitudinally extending vertically disposed plane of symmetry, an integral fastener pine-tree type shank projecting outwardly from said bottom side with its principal axis intersecting said major axis at right angles, each said pine-tree type shank adapted for push-in axial insertion in an associated one of said sheet metal skin mounting holes about said principal axis;
  an integral fastener collar extending outwardly from said upper side symmetrically disposed on said major axis, a fastener circular head extending radially outwardly from said collar and having its center aligned on said principal axis, said head having an undersurface thereof formed with a C-shaped continuous chamfer having a half-circle segment terminating in a pair of parallel trailing segments;
  an integral locking cam extending outwardly from said base upper side symmetrically disposed on said major axis adjacent said trailing edge, said locking cam having a ramp and an arcuate facet in opposite longitudinal relation with said ramp, said ramp sloped toward said fastener head and said arcuate facet spaced a predetermined distance from said collar outboard shoulder, said arcuate facet having a predetermined radius of curvature with its center located on said major axis;

each said panel return flange keyhole-shaped aperture circular opening having a predetermined diameter slightly larger than said head, said keyhole-shaped aperture predetermined maximum longitudinal dimension from said slot one closed end to a diametrically opposite arcuate portion of said circular opening slightly larger than the longitudinal dimension along said major axis between said cam arcuate facet and the diametrically opposite collar stop shoulder;

each said base having the trailing portion thereof aft of said collar canted outwardly from said base inner surface by a slight acute angle whereby said base trailing portion upper surface is adapted to be resiliently biased into contact with said sheet metal skin opposed surface thereof;

upon each said retainer device head being initially inserted in an associated one of said keyhole-shaped aperture circular openings with said base leading transverse edge spaced a predetermined longitudinal dimension from the slot closed one end, wherein said chamfer half-circle segment engaging said keyhole-shaped aperture pair of cusps allowing guided smooth lead-in insertion of each said retainer device therein, such that moving each said retaining longitudinally toward its associated slot one closed end causes each said pair of chamfer parallel trailing segments to engage their associated slot parallel side edges and said collar leading stop edge to engage its associated slot one closed end; and wherein said locking cam snaps into its associated keyhole-shaped aperture circular opening with said arcuate facet providing line contact with its associated circular opening at a point of intersection thereof with its associated major axis, whereby each said retainer is snugly captured in its associated keyhole-shaped aperture with each said pine-tree type shank principal axis exactly aligned with its associated sheet metal skin mounting hole so as to be axially received in a push-in manner therein readily securing each said panel return flange to said sheet metal skin.

* * * * *